United States Patent
Sauter et al.

(10) Patent No.: US 6,595,601 B2
(45) Date of Patent: Jul. 22, 2003

(54) METHOD AND DEVICE FOR REGULATING BRAKING EFFECT

(75) Inventors: Thomas Sauter, Remseck (DE); Johannes Schmitt, Markgroeningen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/914,607

(22) PCT Filed: Dec. 22, 2000

(86) PCT No.: PCT/DE00/04616
§ 371 (c)(1), (2), (4) Date: Feb. 5, 2002

(87) PCT Pub. No.: WO01/49541
PCT Pub. Date: Jul. 12, 2001

(65) Prior Publication Data
US 2002/0135228 A1 Sep. 26, 2002

(30) Foreign Application Priority Data
Dec. 30, 1999 (DE) .......................... 199 63 745

(51) Int. Cl.[7] ............................................ B60T 8/60
(52) U.S. Cl. ................................ 303/146; 303/140
(58) Field of Search ............................. 303/140, 142, 303/146; 701/70, 72

(56) References Cited

U.S. PATENT DOCUMENTS

| 6,149,251 A | * 11/2000 | Wuerth et al. ............... 303/146 |
| 6,157,887 A | * 12/2000 | Zittlau ........................ 701/70 |
| 6,219,610 B1 | * 4/2001 | Araki ......................... 701/72 |
| 6,272,418 B1 | * 8/2001 | Shinmura et al. ............. 701/72 |
| 6,409,286 B1 | * 6/2002 | Fennel ....................... 303/140 |

FOREIGN PATENT DOCUMENTS

| DE | 43 05 155 | 8/1994 |
| DE | 196 04 126 | 8/1997 |
| DE | 196 15 294 | 10/1997 |
| DE | 196 19 381 | 11/1997 |
| DE | 197 08 508 | 3/1998 |
| EP | 0 166 258 | 1/1986 |

OTHER PUBLICATIONS

"FDR—Die Fahydynamikregelung von Bosch"[ESP—The Electronic Stability Program of Bosch], Automobiltechnischen Zeitschrift (ATZ) 96, 1994, Issue 11, pp. 674–89.
SAE paper 870337 "ASR—Traction Control—A Logical Extension of ABS".

* cited by examiner

Primary Examiner—Christopher P. Schwartz
(74) Attorney, Agent, or Firm—Kenyon & Kenyon

(57) ABSTRACT

A method for the open-loop or closed-loop control of the braking action at at least one wheel of a vehicle. In this method, a transverse-dynamics quantity is ascertained which describes the transverse dynamics of the vehicle. As a function of a vehicle-dynamics quantity which describes the vehicle dynamics, or a wheel-dynamics quantity which describes the wheel dynamics of at least one wheel, it is determined whether a driver-independent braking intervention is necessary. In the event that a driver-independent braking intervention is necessary, a pulse-shaped signal is determined for triggering the actuators assigned to at least one wheel. The first pulse of the pulse-shaped signal is influenced in its time duration as a function of the transverse-dynamics quantity.

13 Claims, 3 Drawing Sheets

METHOD AND DEVICE FOR REGULATING BRAKING EFFECT

FIELD OF THE INVENTION

The present invention relates to a method and a device for the open-loop or closed-loop control of the braking action at at least one wheel of a motor vehicle.

BACKGROUND INFORMATION

A method and device for the open-loop or closed-loop control of the braking action at at least one wheel of a vehicle are known from the related art in a great variety of modifications.

For example, a method and a device for controlling the wheel slip are known from the publication *"FDR—Die Fahydynamikregelung von Bosch"* [ESP—The Electronic Stability Program of Bosch] appearing in the Automobiltechnischen Zeitschrift (ATZ) 96, 1994, issue 11 on pages 674 through 689. Using this method and this device, respectively, the yaw rate of the vehicle is controlled by regulating the wheel slip. For this purpose, the measured yaw rate is compared to a setpoint value for the yaw rate, a system deviation for the yaw rate being ascertained. As a function of this system deviation, setpoint slip alterations, inter alia, are ascertained, from which the setpoint slip values to be adjusted at the individual wheels are determined. The actuators assigned to the individual wheels for adjusting the setpoint slip values are driven as a function of the setpoint slip values and the ascertained actual slip values. This type of control is designated as braking interventions carried out independently of the driver. As a backup, engine interventions can also be carried out to reduce the torque delivered by the engine. Primarily by the driver-independent, wheel-individual braking interventions, a yawing moment is applied to the vehicle by which the actual yaw rate of the vehicle approximates the setpoint value for the yaw rate. The contents of the publication *"FDR—Die Fahrdynamikregelung von Bosch"* is herewith intended to be included in the description and thus to be part of the description.

The SAE paper 870337 *"ASR—Traction Control—A Logical Extension of ABS"* describes a method and a device for controlling the wheel slip. In the case of accelerative force, the traction slip of the driven wheels is controlled with this method and this device, respectively. To this end, the ascertained actual slip is compared to appertaining slip thresholds. If the actual slip exceeds the slip thresholds, then first of all, driver-independent braking interventions are carried out at the driven wheels. Secondly, the torque delivered by the engine is reduced. The contents of the SAE paper 870337 is herewith intended to be included in the description and thus to be part of the description.

The German Patent 196 04 126 describes a control of a braking system, in which the braking pressure is built up and reduced by pulses with variable parameters. The parameters are altered as a function of the dynamics of the pressure change, particularly as a function of the temperature of the brake hydraulic fluid.

Both in the closed-loop control as well as in the open-loop control of the wheel slip indicated above, the following problem can occur: Transverse forces act on the vehicle during cornering. The result of these transverse forces is, inter alia, that in the case of the wheel brake cylinders allocated to the wheels, the pistons, which are moved for generating the braking action, are deflected. This deflection of the pistons leads to an air gap. If in such a situation, in which the pistons are deflected because of cornering, the intention is now to carry out a braking intervention independently of the driver, then an increased demand for braking medium is required to compensate for this increased air gap. If this increased need for braking medium is not taken into account when carrying out a driver-independent braking intervention, then especially in the control of the wheel slip indicated at the outset, by which the yaw rate of the vehicle is controlled, deviations can occur in the control.

Various devices and methods which deal with this problem are known from the related art.

For example, reference is made to the traction control system disclosed in EP 0 166 258 B2. In this traction control system, below the thresholds signaling the incipient slippage, a small braking pressure is applied automatically at the brakes which is just large enough that the brake shoes are in fact applied, but still no considerable braking takes place. In this case, it is a question of a fill pulse of constant duration that is fed prior to the actual pressure feed which originates in the traction control system and with which the traction slip, which is too high, is to be eliminated.

The German Patent 196 15 294 describes a slip control in which a fill pulse is likewise ascertained. To this end, first of all a criterion describing and/or influencing the vehicle movement is ascertained, and secondly, a quantity is ascertained describing the wheel dynamics of at least one wheel. As a function of the ascertained criterion, it is checked whether a driver-independent braking intervention is foreseeable at one wheel. If it is determined that a driver-independent braking intervention is foreseeable, then prior in time to the foreseeable driver-independent braking intervention, the actuators assigned to the wheel are actuated slightly for a variable time duration. The duration of the slight actuation of the actuators is ascertained as a function of the quantity describing the wheel dynamics of the appertaining wheel.

The two slip controls belonging to the related art have the disadvantage that a separate fill pulse is generated which is not due to the slip control. It can thereby occur that a fill pulse is generated, although a pressure feed which originates in the slip control is not necessary at all. This can adversely affect driving comfort, since to generate the fill pulse, a pump contained in the braking system must be actuated, which is associated with a development of noise perceptible by the driver.

SUMMARY OF THE INVENTION

Therefore, the object of the present invention is to improve existing methods and devices for the open-loop or closed-loop control of the braking action at at least one wheel of a vehicle.

The method of the present invention is a method for the open-loop or closed-loop control of the braking action at at least one wheel of a vehicle. In this method, a transverse-dynamics quantity is ascertained which describes the transverse dynamics of the vehicle. This transverse-dynamics quantity can be the transverse acceleration acting on the vehicle or the yaw velocity of the vehicle. Provided that appropriate sensors are present, these quantities are either ascertained with the aid of these sensors, or, if appropriate sensors are not present, are derived from other quantities, for example, the wheel speeds.

As a function of a vehicle-dynamics quantity which describes the vehicle dynamics, or a wheel-dynamics quantity which describes the wheel dynamics of at least one wheel, it is determined whether a driver-independent braking intervention is necessary.

For example, if it is a question of a slip control as is described in the publication *"FDR—Die Fahrdynamikregelung von Bosch"* indicated at the outset, then the vehicle-dynamics quantity corresponds to the yaw velocity of the vehicle. In altered form, the transverse acceleration acting on the vehicle can also be evaluated as an alternative. At this point, it should be pointed out that the use of the two terms transverse-dynamics quantity and vehicle-dynamics quantity are to be understood such that both quantities are fundamentally different quantities. However, this is not intended to rule out the possibility that both quantities are identical. For example, this is the case when both the transverse-dynamics quantity and the vehicle-dynamics quantity correspond to the transverse acceleration acting on the vehicle.

A driver-independent braking intervention is necessary when a system deviation for the vehicle-dynamics quantity exists, or when the system deviation is greater than a corresponding threshold value.

For example, if it is a question of a device as is described in the SAE paper 870337, then the wheel-dynamics quantity corresponds to the wheel slip. Alternatively, the wheel deceleration or the wheel acceleration can also be evaluated. The combined evaluation of a vehicle-dynamics quantity and a wheel-dynamics quantity is also conceivable. In this case, a driver-independent braking intervention is performed when the wheel-dynamics quantity is greater than a corresponding threshold value.

In the event that a driver-independent braking intervention is necessary, a pulse-shaped signal is determined for triggering the actuators assigned to at least one wheel. This pulse-shaped signal is advantageously a modulated, particularly a pulse-width-modulated signal. The degree to which the actuators assigned to the respective wheel are actuated is established by the modulation of the signal. Usually the actuators are valves allocated to the respective wheel, by whose actuation braking medium is let into and out of the wheel-brake cylinder.

For example, the braking system can be a hydraulic or an electrohydraulic braking system, in which a brake fluid is used as braking medium. Alternatively, the braking system can also be a pneumatic or an electropneumatic, in which air is used as braking medium. In addition, it can be an electromechanical braking system, in which the braking action is applied in an electromotive manner.

According to the present invention, the time duration of the first pulse of the pulse-shaped signal is influenced as a function of the transverse-dynamics quantity. Because the first pulse of the pulse-shaped signal is influenced in its duration, no separate fill pulse is necessary. That is to say, no additional triggering of the pump required. The increased air gap is compensated directly by the triggering of the actuators with the aid of the pulse-shaped signal.

Advantageously, the duration of the first pulse of the pulse-shaped signal is prolonged as a function of the transverse-dynamics quantity.

Because the first pulse of the pulse-shaped signal is prolonged, a pressure-buildup dynamic is achieved when cornering which is comparable to that when driving straight ahead.

In one advantageous refinement, the braking action is applied hydraulically, and the pulse-shaped signal is determined as a function of at least two different, selectable determination modes. In this case, it is provided in particular that the determination modes are based on at least two different hydraulic models. The determination modes are then selected as a function of the transverse-dynamics quantity, such that the first pulse of the pulse-shaped signal is influenced in its time duration.

Further advantages and advantageous refinements can be gathered from the Drawing and the description of the exemplary embodiment.

DETAILED DESCRIPTION

Arrangement for ascertaining a transverse-dynamics quantity AY_B is designated by 101. The transverse-dynamics quantity is, for example, the transverse acceleration acting on the vehicle. The transverse-dynamics quantity is supplied to a block 103. Arrangement 101 is, for example, a transverse-acceleration sensor.

Various further sensors are represented by 102. At any rate, block 102 includes wheel-speed sensors with which the wheel speeds of the individual wheels are detected. If the slip control is such as is described in the publication *"FDR—Die Fahrdynamikregelung von Bosch"*, then block 102 also includes a steering-angle sensor, a yaw-rate sensor and an admission-pressure sensor with which the admission pressure adjusted by the driver is detected. The signals detected by the various sensors are combined to form S1. Signals S1 are likewise supplied to block 103.

Block 103 represents a regulator arrangement with which the actual open-loop or closed-loop control of the wheel slip is carried out. To this end, the quantities supplied to it are evaluated. If it is a traction control system as is described in the SAE paper 870337, then in block 103, the wheel speeds supplied to it by block 102 are evaluated. In this case, an actual slip is determined for the driven wheels as a function of the wheel speeds. This actual slip is compared to corresponding threshold values. On the basis of this comparison, signals S2 are determined in block 103 which are supplied to actuators 104. For example, the actuators are valves allocated to the individual wheels, as well as an arrangement by which the torque delivered by the engine can be influenced.

If it is a slip control as is described in the publication *"FDR—Die Fahrdynamikregelung von Bosch"*, then in block 103, the actual yaw rate supplied to it by block 102 is compared to a setpoint yaw rate. The setpoint yaw rate is determined with the aid of a mathematical model as a function of the ascertained steering angle, which is supplied to block 103 starting from block 102, and the vehicle speed which is ascertained in block 103 from the wheel speeds likewise supplied to it starting from block 102. As a function of the system deviation resulting from the actual yaw rate and the setpoint yaw rate, signals S2 are generated in block 103 in this case as well, which are used to trigger the actuators assigned to the individual wheels, as well as the arrangement for influencing the torque delivered by the engine.

Starting from actuators 104, block 104 is supplied with signals S3, via which block 103 receives information about the state of the actuators.

Figure 1:
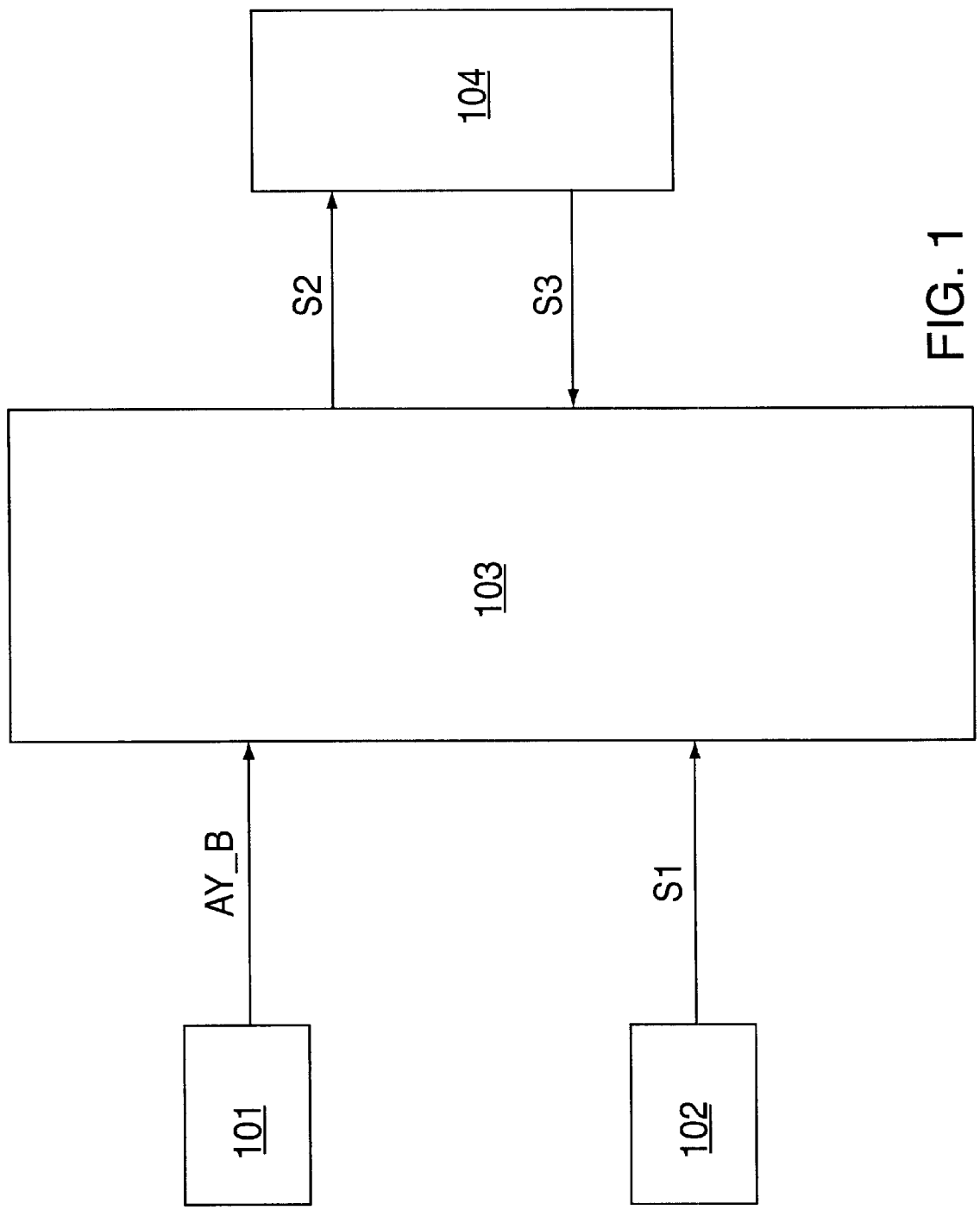
FIG. 1 shows the device of the present invention in an overview with the aid of a block diagram.
Figure 2:
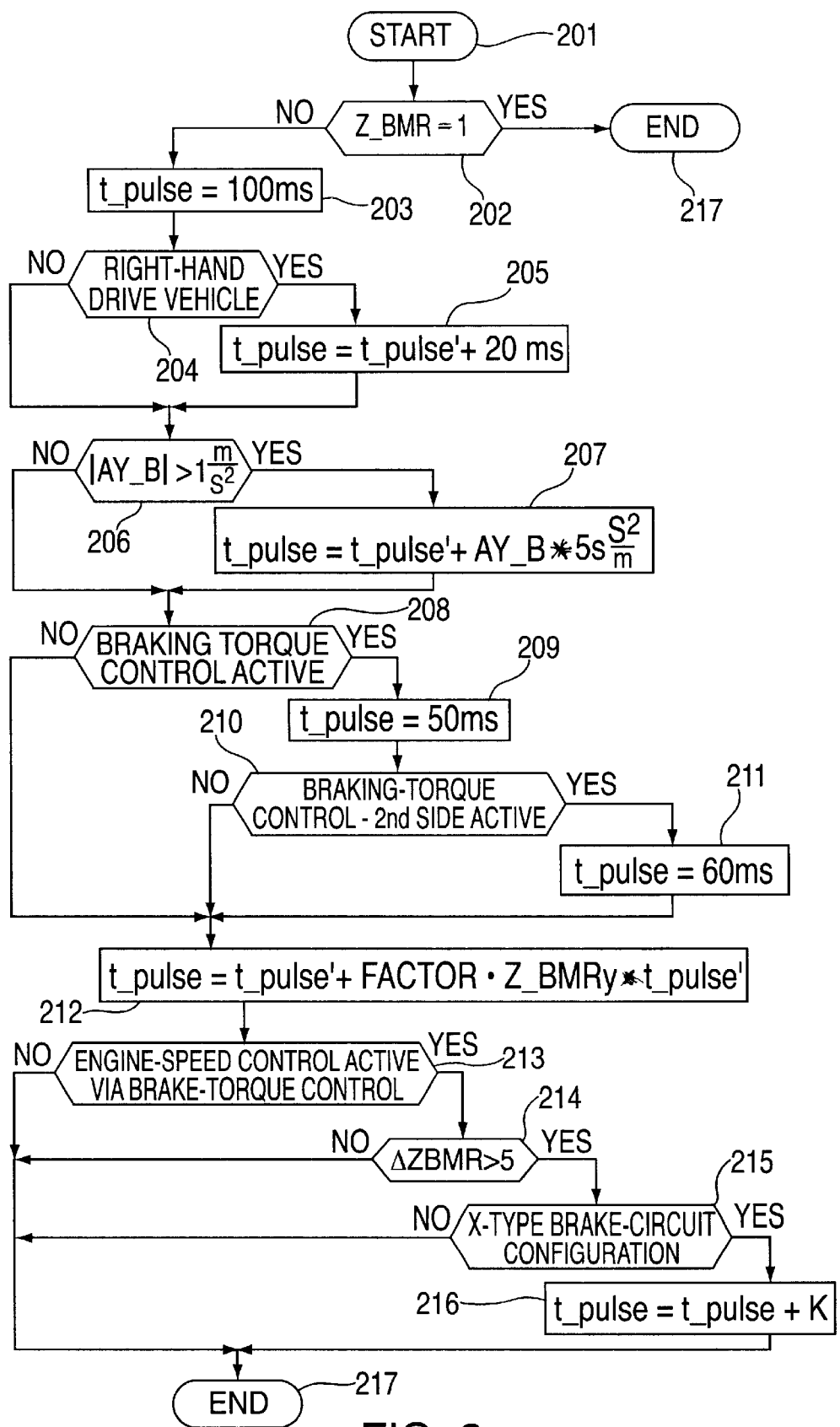
FIG. 2, in the form of a flow chart, shows the method of the present invention proceeding in the device of the present invention.

In the following, FIG. 2 is discussed. It should be pointed out in advance that in FIG. 2, in the branching blocks in which queries are carried out, the question marks have been omitted for the sake of simplicity.

The method of the present invention begins with a step 201. Following step 201, a step 202 is carried out. In this step, the value of pulse counter Z_BMR is checked. If the value of the pulse counter is not equal to 1, then following step 202, a step 217 is carried out with which the method of the present invention is brought to an end. On the other hand, if it is determined in step 202 that the pulse counter has the value 1, then following step 202, a step 203 is carried out with which the actual adaptation of the first pulse of the pulse-shaped signal begins. Pulse counter Z_BMR is checked for the value 1, since only the first pulse of the pulse-shaped signal is to be influenced as a function of the transverse-dynamics quantity.

In step 203, a predefined time duration, in the present exemplary embodiment the time duration 100 ms, is allocated to a quantity t_pulse which describes the pulse duration of the first pulse of the pulse-shaped signal. In the following step 204, it is checked whether the vehicle is a right-hand drive vehicle, that is to say, a vehicle in which the steering wheel is mounted on the right side of the vehicle. This query is carried out because in the case of a right-hand drive vehicle, usually a longer suction line must be taken into account than for a left-hand drive vehicle. That is to say, with the query taking place in step 204, the suction-line length and the cross-section of the suction line, respectively, that is, the resistance to flow, is taken into account. If it is a right-hand drive vehicle, then following step 204, a step 205 is carried out. In this step, the t_pulse determined in step 203, which is designated with t_pulse' in step 205, is increased by a predefined time duration, in the present exemplary embodiment by 20 ms. This increase compensates for the suction-line length and the cross-section of the suction line, respectively If, on the other hand, it is determined in step 204 that it is not a right-hand drive vehicle, then directly following step 204, step 206 is carried out, since in this case a correction with respect to the suction-line length and the cross-section of the suction line, respectively, is not necessary.

At this point, it should be stressed that the two steps 204 and 205 can also be omitted when the influence of the suction-line length and/or the influence of the cross-section of the suction line is not too great. Alternatively, allowance can also already be made for these two influences in the time duration which is used in the allocation taking place in step 203.

In step 206, transverse-dynamics quantity AY_B, which in the present exemplary embodiment corresponds to a transverse acceleration, is evaluated. For this purpose, in step 206 the amount of transverse-dynamics quantity AY_B is compared to a threshold value, in the present exemplary embodiment the value 1 m/s$^2$. If it is determined in step 206 that the amount of transverse-dynamics quantity AY_B is greater than the threshold value, which is synonymous with the fact that an influencing, i.e. an extension of the time duration of the first pulse of the pulse-shaped signal is to be achieved, then subsequent to step 206, a step 207 is carried out. The actual correction of the time duration of the first pulse of the pulse-shaped signal takes place in step 207. To that end, starting from the time duration t_pulse determined in step 205, which is designated by t_pulse' in step 207, the time duration corrected as a function of the transverse-dynamics quantity is ascertained according to the equation $$T\_pulse = t\_pulse' + AY\_B * 5 \ s^2/m * 1 \ (ms),$$

that is to say, the corrected time duration is yielded as a function of a predefined time duration for the first pulse and a summand which is a function of the transverse-dynamics quantity and a factor, in the present exemplary embodiment the value 5 (ms)/m; ((ms) means milliseconds in this context). The factor is determined in the preliminary stages with the aid of driving tests and theoretical considerations. Subsequent to step 207, a step 208 is carried out. Given a transverse acceleration of 10 m/s$^2$, according to the above formula, a pulse-extension time of 50 ms results.

However, if it is determined in step 206 that the amount of transverse-dynamics quantity AY_B is less than the threshold value, then subsequent to step 206, step 208 is carried out at once, since in this case, because of the insignificant transverse-dynamics of the vehicle, a correction of the time duration as a function of the transverse-dynamics quantity is not necessary.

In step 208, by evaluating the flag BMR_active, it is checked whether the braking-torque control is active. If the braking-torque control is active, then following step 208, a step 209 is carried out. In this step, a predefined value for the time duration is assigned to the quantity t_pulse. The value assigned in step 209 is smaller than the value assigned in step 203. In the present exemplary embodiment, the value for the time duration used in step 209 is 50 ms.

Subsequent to step 209, a step 210 is carried out. In this step, it is checked whether the second wheel of the brake circuit is added to the control already in operation. If this is the case, then following step 210, a step 211 is carried out in which a predefined value for the time duration is assigned to the quantity t_pulse. The value assigned in step 211 is indeed less than the value assigned in step 203, but is greater than the value used in step 209. Subsequent to step 211, a step 212 is carried out.

If it is determined in step 208 that the braking-torque control is not active, then step 212 is carried out directly following step 208. If it is determined in step 210 that the second wheel of the brake circuit has not yet been added to the control already in operation, then step 212 is likewise carried out directly following step 210.

A further evaluation of the time duration of the first pulse of the pulse-shaped signal takes place in step 212. This further evaluation is carried out using the equation $$t\_Pulse = t\_Pulse' + Factor * Z\_BMR_y * t\_Pulse'.$$

That is to say, the value of the new time duration t_pulse results as the sum of the value of the old time duration t_pulse' and the value of the old time duration weighted with a factor. This determination takes into account how much pressure is in the other wheel, since this acts as an accumulator.

$$t\_Pulse = t\_Pulse' + Factor * Z\_BMR_y * t\_Pulse'.$$

$$55 \ ms = 60 \ ms + (-0.015) * 5 * 60 \ ms$$

can be regarded as realistic numerical examples.

Following step 212, a step 213 is carried out in which it is checked whether the engine-speed control of the hydraulic pump contained in the braking system is active via the braking-torque control. If this is not the case, then directly following step 213, step 217 is carried out with which the method of the present invention is brought to an end. If, however, the engine-speed control is active, then following step 213, a step 214 is carried out. In this step, it is checked whether the quantity ΔZBMR is greater than a predefined value, in the present exemplary embodiment greater than the value 5. If this is not the case, then following step 214, step 217 is likewise carried out. If, however, the query contained in step 214 is satisfied, then following step 214, a step 215 is carried out. In this step, it is checked whether an X-type brake-circuit configuration is present. If no X-type brake-circuit configuration is present, then following step 215, step 217 is carried out, as well. However, if an X-type brake-circuit configuration is present, then following step 215, a step 216 is carried out. In this step, a quantity K, with which compensation is made for the influence of the existing X-type brake-circuit configuration on the pressure increase, is added to the time duration ascertained in step 212. Subsequent to step 216, step 217 is carried out with which the method of the present invention is brought to an end.

Figure 3:
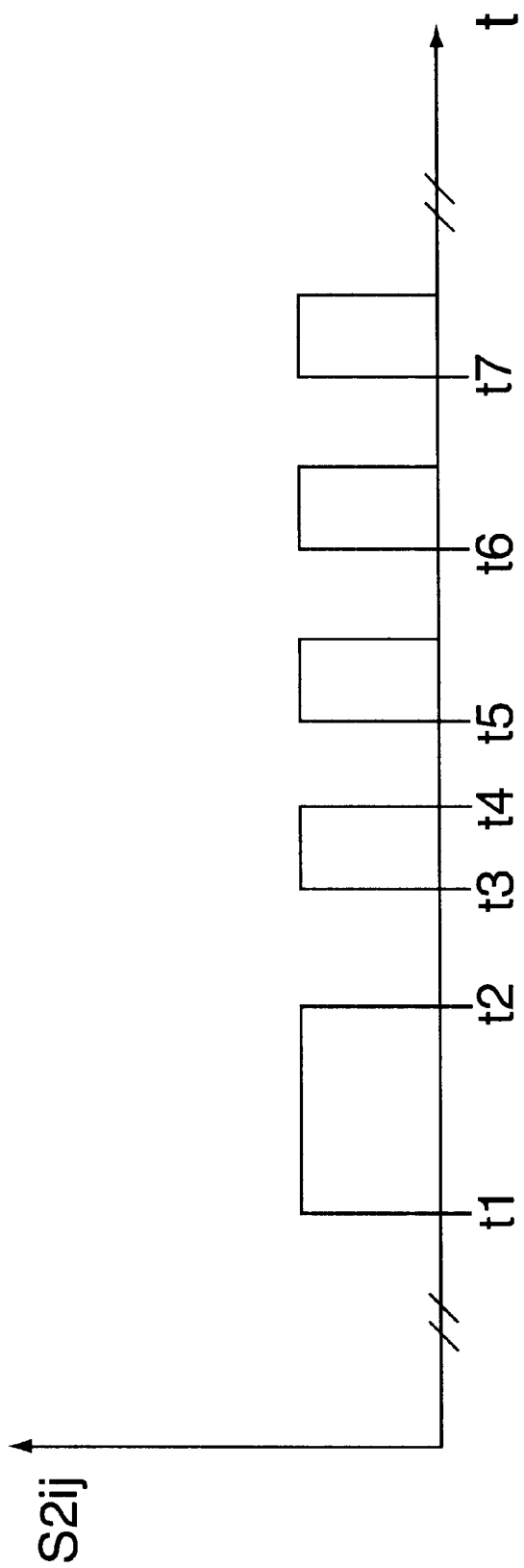
FIG. 3 represents a signal pattern.

In the following, FIG. 3 is discussed. This figure shows a pulse-shaped signal S2$ij$ with which the actuators assigned to one wheel are triggered. The two indices i and j, respectively, are wild cards with which it can be determined whether it is a front or a rear wheel (index i), and whether it is a left or a right wheel (index j). As can be gathered from the representation in FIG. 3, the first pulse, which is defined by points of time t1 and t2, has a longer time duration than the following pulses which begin at points of time t3, t5, t6 and t7. The time duration of the first pulse was ascertained according to the method of the present invention presented in FIG. 2. The fact that the pulses following the first pulse have the same spacing among themselves, and that these pulses have the same width is not intended to have any restrictive effect. This representation was merely selected to elucidate the prolongation of the time duration of the first pulse.

At this point, it should be stressed that it is also conceivable to use the subject matter of the present invention in altered form when working with an electromechanical braking system, as well.

The representation selected in the description and in the Figures is not intended to have any restrictive effect on the method and/or the device of the present invention.

What is claimed is:

1. A method for performing one of an open-loop control and a closed-loop control of a braking action at at least one wheel of a motor vehicle, comprising the steps of:

ascertaining a transverse-dynamics quantity that describes transverse dynamics of the motor vehicle;

determining whether a driver-independent braking intervention is necessary as a function of one of a vehicle-dynamics quantity that describes vehicle dynamics and a wheel-dynamics quantity that describes wheel dynamics of the at least one wheel;

if the driver-independent braking intervention is necessary, determining a pulse-shaped signal for triggering actuators, assigned to the at least one wheel, for adjusting the braking action at the at least one wheel; and influencing a first pulse of the pulse-shaped signal in a time duration thereof as a function of the transverse-dynamics quantity.

2. The method according to claim 1, wherein:

in order to determine the transverse-dynamics quantity, one of a transverse force acting on the motor vehicle and a yawing of the motor vehicle is detected.

3. The method according to claim 2, wherein:

the transverse force includes a transverse acceleration acting on the motor vehicle.

4. The method according to claim 2, wherein:

the yawing of the motor vehicle includes a yaw velocity of the motor vehicle.

5. The method according to claim 4, further comprising a performance of at least one of the steps of:

causing a transverse-acceleration sensor to detect the transverse force acting on the motor vehicle, causing a yaw-rate sensor to detect the yaw velocity of the motor vehicle, and determining at least one of the transverse force acting on the motor vehicle and the yaw velocity as a function of detected wheel speeds.

6. The method according to claim 1, wherein:

the vehicle-dynamics quantity represents at least one of a transverse force acting on the motor vehicle and a yawing of the motor vehicle, and the wheel-dynamics quantity represents at least one of a wheel slip, a wheel acceleration, and a wheel deceleration of the at least one wheel of the motor vehicle.

7. The method according to claim 1, further comprising the step of:

performing a modulation on the pulse-shaped signal to produce a pulse-width-modulated signal, wherein:
a degree of actuation of a triggered one of the actuators is determined by the modulation.

8. The method according to claim 1, wherein:

the first pulse of the pulse-shaped signal is influenced in the time duration thereof as a function of the transverse-dynamics quantity such that the first pulse is prolonged as a transverse movement of the motor vehicle increases.

9. The method according to claim 1, further comprising the steps of:

hydraulically applying the braking action;

determining the pulse-shaped signal as a function of at least two different selectable determination modes that are based on at least two different hydraulic models; and selecting the at least two different selectable determination modes as a function of the transverse-dynamics quantity such that the first pulse of the pulse-shaped signal is influenced in the time duration.

10. A device for achieving one of an open-loop control and a closed-loop control of a braking action at at least one wheel of a motor vehicle, comprising:

an arrangement for ascertaining a transverse-dynamics quantity that describes transverse dynamics of the motor vehicle;

an arrangement for determining whether a driver-independent braking intervention is necessary as a function of one of a vehicle-dynamics quantity that describes vehicle dynamics and a wheel-dynamics quantity that describes wheel dynamics of the at least one wheel;

an arrangement for, if the driver-independent braking intervention is necessary, determining a pulse-shaped for triggering actuators, assigned to the at least one wheel, for adjusting the braking action at the at least one wheel; and an arrangement for influencing a first pulse of the pulse-shaped signal in a time duration thereof as a function of the transverse dynamic quantity.

11. The device according to claim 10, wherein:

the pulse-shaped signal is modulated to produce a pulse-width-modulated signal, and a degree of actuation of a triggered one of the actuators is determined by the modulation.

12. The device according to claim 10, wherein:
the first pulse of the pulse-shaped signal is influenced in the time duration thereof as a function of the transverse-dynamics quantity such that the first pulse is prolonged as a transverse movement of the motor vehicle increases.

13. The device according to claim 10, further comprising:
one of a hydraulic braking system, an electrohydraulic braking system, a pneumatic braking system, an electropneumatic braking system, and an electromechanical braking system to apply the braking action.

* * * * *